United States Patent [19]

Sado et al.

[11] 4,203,088
[45] May 13, 1980

[54] PRESSURE-SENSITIVE MULTIPLE RESISTOR ELEMENTS

[75] Inventors: Ryoichi Sado, Saitama; Akio Nakamura, Toda, both of Japan

[73] Assignee: Shin-Etsu Polymer Co., Ltd., Japan

[21] Appl. No.: 968,810

[22] Filed: Dec. 12, 1978

[30] Foreign Application Priority Data

Dec. 15, 1977 [JP] Japan .................... 52-151143

[51] Int. Cl.² .................................................. H01C 10/10
[52] U.S. Cl. ........................................... 338/114; 338/69
[58] Field of Search ............. 338/114, 2, 69, 96, 338/100, 101, 104, 106, 109, 71, 99, 223; 200/159 B

[56] References Cited

U.S. PATENT DOCUMENTS

| | | |
|---|---|---|
| 3,398,233 | 8/1968 | DeLizasoain et al. .......... 338/114 X |
| 3,629,774 | 12/1971 | Crites .................................. 338/99 X |
| 3,960,044 | 6/1976 | Nagai et al. ........................ 338/114 |

*Primary Examiner*—C. L. Albritton
*Attorney, Agent, or Firm*—Hopgood, Calimafde, Kalil, Blaustein & Lieberman

[57] ABSTRACT

A pressure sensitive multiple resistor element is proposed whereby two or more variations of resistance can be obtained simultaneously by applying a single compressive force. It comprises an anisotropically electroconductive composite sheet exhibiting varied resistance between its opposite surface as a result of the compressive force applied thereto, a set of electrodes provided on one surface of the composite sheet, another set of electrodes provided on the other surface, and a means for applying the compressive force to the composite sheet through the electrodes. The anisotropically electroconductive composite sheet is formed of an electrically insulating rubbery elastomer as the matrix within which many electroconductive fibers are dispersed and oriented in the direction perpendicular to the plane of the sheet.

2 Claims, 6 Drawing Figures

PRESSURE-SENSITIVE MULTIPLE RESISTOR ELEMENTS

BACKGROUND OF THE INVENTION

The present invention relates to novel pressure sensitive multiple resistor elements or pressure sensitive multiple rheostats.

There are known various types of variable resistor elements or rheostats and, in particular, pressure sensitive resistor elements which have found a wide variety of applications owing to their simple structure and compactness.

The pressure sensitive resistor elements are used to obtain variable resistance by applying a compressive force between the electrodes. In other words, there is a one-to-one correspondence between the variable resistor elements and the resistance to be varied. Recently, there has arisen a demand for a variable resistor element with which, in a complicated electronic circuits, two or more variations of resistance can be obtained simultaneously by a single application of a compressive force between the electrodes, especially, keeping the ratio between the values of resistance approximately constant. Such demand, however, can hardly be complied with when the variable resistor elements of the conventional type without an elaborate combination of a plurality of the elements are used, and no noteworthy proposals have been made.

SUMMARY OF THE INVENTION

It is therefore an object of the present invention to provide novel pressure senstitive resistor elements with which two or more variations of resistance can be simultaneously obtained by the application of a single compressive force between a pair of electrodes.

Another object of the present invention is to provide novel pressure sensitive resistor elements with which two or more variations of resistance can be simultaneously obtained, while the ratio between the values of the resistance is kept approximately constant by application of a single compressive force between a pair of electrodes.

The pressure sensitive multiple resistor element of the present invention comprises (a) an anisotropically electroconductive sheet formed of an electrically insulating rubbery elastomer as a matrix within which a number of electroconductive fibers are dispersed and oriented in alignment in the direction substantially perpendicular to the plane of the sheet, (b) one or a set of two or more electrodes provided on one surface of the sheet, (c) a set of two or more electrodes provided on the other surface of the sheet, and (d) a means for applying a compressive force to the sheet in a direction substantially parallel with the direction of the orientation of the electroconductive fibers.

Using the resister element having the above components and construction, simultaneously variable resistance with proportionality between the values of the resistance can be obtained by suitably selecting the combination of the electrodes to be integrated into an electronic circuit and applying a single compressive force.

BRIEF DESCRIPTION OF THE DRAWINGS

FIG 1b is an equivalent circuit diagram corresponding to the arrangement of FIG. 1a.

FIG. 2b is an equivalent circuit diagram corresponding to the arrangement in FIG. 2a.

FIG. 3b is an equivalent circuit diagram corresponding to the arrangement of FIG. 3a.

DETAILED DESCRIPTION OF THE PREFERRED EMBODIMENTS

Figure 1A:
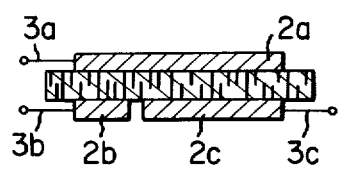
FIG. 1a is a schematic cross-sectional view of a pressure sensitive multiple resistor element of the present invention with an anisotropically electroconductive composite sheet, on one side of which an electrode is placed and on the other side of which a set of two electrodes are placed.

Referring to FIG. 1a, which shows a basic structure of the pressure sensitive multiple resistor element of the present invention, 1 is an anisotropically electroconductive composite sheet, 2a, 2b and 2c are electrodes bonded to one or the other surface of sheet 1, and 3a, 3b and 3c are lead wires connecting respective electrodes 2a, 2b or 2c to an electronic circuit. The means for applying a compressive force is omitted in order to make the figure simple.

The anisotropically electroconductive composite sheet 1 used in the present invention is a composite material with a matrix of a rubber-like elastomer and many fibers of an electroconductive material dispersed therein in alignment in a direction substantially perpendicualr to the plane of the sheet. The electroconductive fibers have a length distribution such that part of them penetrate the sheet from one surface to the other but the rest are not long enough to penetrate the sheet from one surface to the other.

The electroconductive fibers have desirably a good elasticity, and may be selected from, for example, fibers, fine wires, solid or hollow filaments of carbon, graphite, metals, e.g. nickel silver, stainless steel, nickel, tungsten, and phosphorus bronze filaments plated with a precious metal. The diameter of the fiber is usually in the range from 5 to 200 $\mu$m.

The rubbery elastomer as the matrix may be any one of natural rubber and synthetic rubbers, preferably a silicone rubber which has excellent heat stability, resistance to chemicals and weathering, as well as electric and mechanical properties.

The anisotropically electroconductive composite sheet material may be prepared by the following manner. The abovementioned electroconductive fibrous material and a rubber compound which is curable into an elastomer are blended to form a plasticized mixture in which the electroconductive fibers have been uniformly dispersed. This process of plasticization blending is performed by use of a suitable conventional blending machine, such as a mixing roller, internal mixer, kneader or the like, in order to obtain a uniform distribution of the fibers in the mixture and, at the same time, to reduce the length of the fibers to the desired extent. If the reduction of the fiber length is insufficient or the dispersed fibers remain too long, the subsequent orientation process of the fibers cannot be effected to a satisfactory degree, and the anisotropy in the electroconductivity of the finished composite sheet may not be exhibited to a desirable extent. On the other hand, if the reduction of the fiber length is made to an excessively high extent by carrying out the blending operation over a too long period of time, a sufficient electro-conductivity may not be obtained with the finished composite sheet material. It is, therefore, recommended that when electroconductive fibers having so high strength that a sufficient reduction of lengths may not be effected in the plasticization blending process are to be used, they should be chopped in a suitable length, e.g. 0.2-10 mm, in advance.

The plasticized mixture obtained by the plasticization blending is then subjected to the process of orientation of the electroconductive fibers. This process is performed by causing plastic deformation to the mixture in a certain direction with stress by use of a screw pump, gear pump, plunger pump or the like, as well as various conventional machines suitable for the fabrication of plastic resins or rubbers, such as extruding machine, injection moulding machine, and calendering machine.

The above-described orientation process brings the electroconductive fibers into a substantially parallel alignment in the direction of the plastic flow of the plasticized mixture. The resulting mixture is obtained in the form of a continuous lengthy rod, pipe, tape, plate or the like, and then integrated into unity as a bundle, followed by solidification by cooling or curing by cross-link formation, and sliced in a plane substantially perpendicular to the orientation of the fibers to produce the desired anisotropically electroconductive sheet-like composite materials having a thickness according to need.

The thus obtained composite sheet is electroconductive in the direction of the orientation of the fibers when pressed perpendicularly to the plane using a suitable force, but highly insulating in the direction paralled to the plane of the sheet, thus exhibiting a good anisotropy in electric conduction.

The electrodes suitable for use in the present invention are formed of gold, silver, nickel, nickel silver or the like in the shape of plates or copper or a copper-based alloy whose surface is treated with plating or vacuum deposition, using a precious metal. They may also be formed of other electroconductive materials, such as electroconductive coating compositions, electroconductive adhesives, electroconductive resins, electroconductive rubbers and the like.

The pressure sensitive resistor element of the present invention can be obtained by integrally providing the above-described electrodes on both opposing surfaces of the above-described anisotropically electroconductive composite sheet. In this case, the electrodes may be directly integrated with the composite sheet by a convenient press-bonding means. It is optional however that the electrodes and the composite sheet are bonded using a conductive sticking agent, pressure-sensitive adhesive or other materials.

Figure 1B:
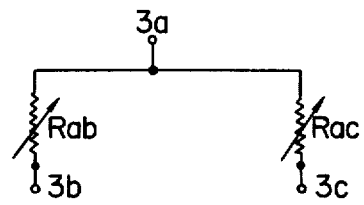

With the arrangement of the composite sheet and the electrodes as shown in FIG. 1a, an equivalent circuit given in FIG. 1b is obtained, in which $R_{ab}$ and $R_{ac}$ are each the resistance between the pairs of electrodes $2a$-$2b$ or $2a$-$2c$, respectively, each resistance being in proportion with the area of the opposite portions of the surfaces of paired electrodes and variable in accordance with the compressive force applied between the electrodes on the opposite surface of the composite sheet. Thus, three variations of resistance, $R_{ab}$, $R_{ac}$ and $R_{bc}$ ($=R_{ab}+R_{ac}$), are obtained simultaneously by applying a single compressive force to the composite sheet through the electrodes. It is natural that proportionality between the resistance $R_{ab}$ and $R_{ac}$ is maintained throughout increases in the compressive force if the compressive force is applied evenly over the composite sheet. Although it is optional to divide the compressive force into two differently varied forces corresponding to the electrode pairs of $2a$-$2b$ and $2a$-$2c$ when the proportionality between $R_{ab}$ and $R_{ac}$ is not essential.

Figure 2A:
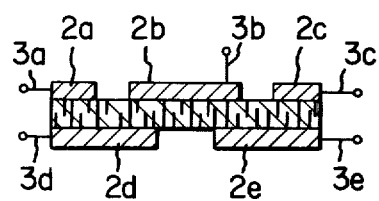
FIG. 2a is a schematic cross-sectional view of a pressure sensitive multiple resistor element of the invention with an anisotropically electroconductive composite sheet, on one side of which a set of three electrodes are placed and on the other side of which a set of two electrodes are placed.
Figure 2B:
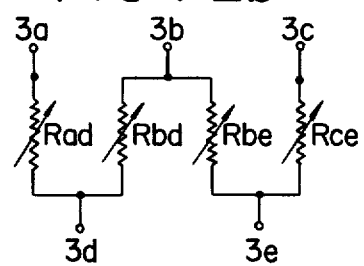

FIG. 2a is a schematic cross-sectional view of another embodiment of the inventive resistor element with a composite sheet 1 and five electrodes, $2a$, $2b$, $2c$, $2d$ and $2e$, three of them, i.e. $2a$, $2b$ and $2c$, being bonded to one of the surface of the composite sheet 1 and two, i.e. $2d$ and $2e$, being bonded to the other surface. The equivalent circuit corresponding to the arrangement of FIG. 2a is shown in FIG. 2b with four variable resistances $R_{ad}$, $R_{bd}$, $R_{be}$ and $R_{ce}$. Thus the number of possible variations in the resistance obtained with this arrangement of a composite sheet and five electrodes is 10, that is, $R_{ad}$, $R_{bd}$, $R_{be}$, $R_{ce}$, $R_{ab}$ ($=R_{ad}+R_{bd}$), $R_{de}$ ($=R_{bd}+R_{be}$), $R_{be}$ ($=R_{be}+R_{ce}$), $R_{ae}$ ($=R_{ad}+R_{bd}+R_{be}$), $R_{cd}$ ($=R_{bd}+R_{be}+R_{ce}$), and $R_{ac}$ ($=R_{ad}+R_{bd}+R_{be}+R_{ce}$).

Figure 3A:
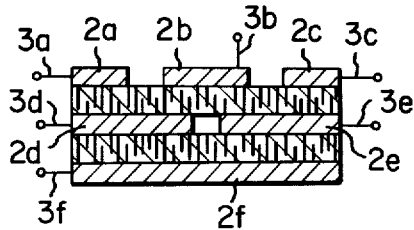
FIG. 3a ia a schematic cross-sectional view of a pressure sensitive resistor element of the invention with two separate anisotropically electroconductive composite sheets, a set of three electrodes being placed on the outer side of a first sheet, a set of two electrodes being sandwiched between the first and a second sheet, and one electrode being placed on the outer side of the second sheet.
Figure 3B:
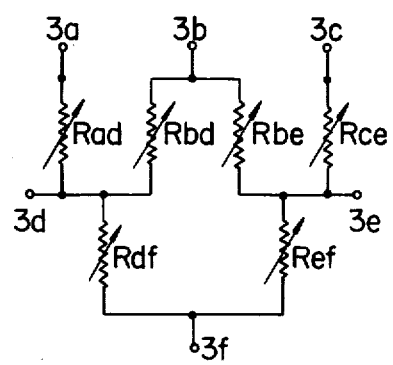

FIG. 3a is a schematic cross sectional view of a further alternative embodiment of the invention with two composite sheets $1a$ and $1b$ and six electrodes $2a$, $2b$, $2c$, $2d$, $2e$ and $2f$, three of them, i.e. $2a$, $2b$ and $2c$, being bonded to a surface of the composite sheet $1a$, two of them, i.e. $2d$ and $2e$, being sandwiched between the composite sheets $1a$ and $1b$ and the electrode $2f$ being bonded to the other surface of the composite sheet $1b$. The equivalent circuit corresponding to the arrangement of FIG. 3a is shown in FIG. 3b with six variable resistances $R_{ad}$, $R_{bd}$, $R_{be}$, $R_{ce}$, $R_{df}$ and $R_{ef}$. With this arrangement of the composite sheets and the electrodes, numerous variances of the resistance values are possible by selecting the combination of the electrodes although listing of the possible combinations is not given here to avoid too much complicacy.

What is claimed is:

1. A pressure sensitive multiple resistor element responsive to an external compressive force comprising
   (a) an anisotropically electroconductive composite sheet formed of an electrically insulating rubbery elastomer as a matrix within which a number of electroconductive fibers are dispersed and oriented in alignment in the direction substantially perpendicular to the plane of the composite sheet.
   (b) at least one electrode provided on one surface of the composite sheet,
   (c) at least two electrodes provided on the other plane surface of the composite sheet, and
   (d) the resistance of said element being varied upon application of said compressive force to the composite sheet in a direction substantially parallel to the direction of the orientation of the electroconductive fibers.

2. The resistor element as claimed in claim 1, further including a second anisotropically electroconductive composite sheet provided on the other surface of said at least two electrodes and a further electrode provided on the other side of said second electroconductive sheet.

* * * * *